United States Patent [19]

Nagasuna et al.

[11] Patent Number: 5,229,488
[45] Date of Patent: Jul. 20, 1993

[54] METHOD FOR MANUFACTURE OF AN ABSORBENT RESIN

[75] Inventors: Kinya Nagasuna; Katsuhiro Kajikawa; Takumi Hatsuda; Yoshio Irie, all of Himeji; Teruaki Fujiwara, Nagaokakyo, all of Japan

[73] Assignee: Nippon Shokubai Kagaku Kogyo Co., Ltd., Osaka, Japan

[21] Appl. No.: 576,942

[22] Filed: Sep. 4, 1990

[30] Foreign Application Priority Data

Sep. 4, 1989 [JP] Japan .................. 1-227547

[51] Int. Cl.$^5$ .................. C08F 6/10; C08F 6/00
[52] U.S. Cl. .................. 528/487; 528/485; 528/499; 524/430; 524/431; 524/437; 524/450
[58] Field of Search .............. 524/430, 431, 437, 450; 528/499, 487

[56] References Cited

U.S. PATENT DOCUMENTS

| | | | |
|---|---|---|---|
| 4,286,082 | 8/1981 | Tsubakimoto et al. | 526/240 |
| 4,306,955 | 12/1981 | Neel et al. | 528/487 |
| 4,340,706 | 7/1982 | Obayashi et al. | 526/207 |
| 4,666,983 | 5/1987 | Tsubakimoto et al. | 525/119 |
| 4,683,274 | 7/1987 | Nakamura et al. | 526/200 |
| 4,766,173 | 5/1988 | Bailey | 524/819 |
| 4,929,717 | 5/1990 | Chmelir | 528/490 |
| 4,954,562 | 9/1990 | Anderson | 524/430 |
| 4,970,267 | 11/1990 | Bailey et al. | 528/487 |

FOREIGN PATENT DOCUMENTS

| | | |
|---|---|---|
| 0249391 | 12/1987 | |
| 33-2646 | 4/1958 | Japan . |
| 56-72005 | 6/1981 | Japan . |
| 56-103207 | 8/1981 | Japan . |
| 64-24808 | 1/1989 | Japan . |
| 64-62317 | 3/1989 | Japan . |
| 1-292003 | 11/1989 | Japan . |

*Primary Examiner*—Paul R. Michl
*Assistant Examiner*—Andrew E. C. Merriam
*Attorney, Agent, or Firm*—Burns, Doane, Swecker & Mathis

[57] ABSTRACT

An absorbent resin is produced by a method which comprises adding to 100 parts by weight of an absorbent resin powder an aqueous liquid containing 7 to 100 parts by weight of water and a reducing substance in the presence of 0.01 to 5 parts by weight of at least one additive selected from the group consisting of water-insoluble fine powders and surfactants. The absorbent resin thus produced excels in absorption properties and exhibits a low residual monomer content.

36 Claims, 1 Drawing Sheet

METHOD FOR MANUFACTURE OF AN ABSORBENT RESIN

TECHNICAL FIELD

This invention relates to a method for the production of an absorbent resin, and more particularly to a method for stable and efficient production of an absorbent resin excelling in various absorbent properties and possessing a low residual monomer content.

BACKGROUND ART

In recent years, absorbent resins are used as one component material for sanitary cotton, disposable diapers, and other sanitary materials for absorbing body fluids and as a water retaining agent in agriculture and horticulture. As such absorbent resins, partially cross-linked polyacrylic acid, hydrolyzed starch-acrylonitrile graft polymer, neutralized starch-acrylic acid graft polymer, saponified vinyl acetate-acrylic ester copolymers, hydrolyzed acrylonitrile copolymers and acrylamide copolymers, and cross-linked products thereof have been known to the art, for example.

Generally, unaltered monomers persist in these absorbent resins. Particularly for the use of these absorbent resins in the fields of sanitary materials and foodstuffs, various attempts are made to decrease the contents of such unaltered monomers in the absorbent resins.

Heretofore, the attempt to decrease the residual monomer in the polymer has long been practised in the field of water-soluble polymers such as, for example, polymeric flocculants. The methods resorted to therefor are broadly classified, as noticed in JP-A-56-103207(1981), under the following three types.

(1) The methods relying on an increase in the amount of a polymerization initiator or on split addition of the polymerization initiator.

(2) The methods relying on extraction as with a solvent.

(3) The methods relying on transformation of the residual monomer to a derivative other than the polymer.

These techniques can be applied to the decrease of the residual monomer in the absorbent resin. The cases of applying methods of the type (1) to absorbent resins are reported in JP-A-56-72,005(1981) and JP-A-64-24,808(1989). When such a method is applied to an absorbent resin, a decrease in the molecular weight of the polymer, a decrease in the absorption capacity in consequence of an excessive self-cross-linking reaction, and an increase in the amount of a water-soluble component are recognized as in the case of applying the method to a water-soluble polymer. Though this method decreases the residual monomer, it impairs the properties of the absorbent resin. A method of the type (2) is reported in JP-A-1-292,003(1989). Though this method is effective in lowering the residual monomer content, it hardly deserves to be called a desirable way of decreasing the residual monomer because it necessitates use of a large amount of a solvent and consequently entails expenditure of a high cost for the recovery of used solvent. As methods of the type of (3) relying on the transformation of the residual monomer to a derivative other than the polymer, a method which contemplates effecting the decrease of the residual monomer in a water-soluble polymer by adding an amine or ammonia to the polymer thereby forming an adduct with the unaltered monomer (JP-A-33-2,646(1958)) and a method which comprises adding a hydrogen sulfite, a sulfite, or a pyrosulfite thereby forming an adduct with the unaltered monomer (JP-A-56-103,207(1981)) have been known to the art. Cases of applying such methods to absorbent resins are also reported JP-A-64-62-317(1989) and DE-A-3,724,709).

The follow-up experiments conducted by the present inventors, however, have revealed that the method disclosed in JP-A-64-62,317(1989) decreases the residual monomer only to an insufficient extent and the method disclosed in DE-A-3,724,709, though capable of effecting the decrease of the residual monomer, requires use of a large amount of water falling in the range of 50 to 500 parts by weight based on 100 parts by weight of the absorbent resin powder and consequently necessitates a step of drying and, therefore, not merely proves to be greatly disadvantageous economically but also brings about serious impairment of the various properties such as, for example, suction power and absorption capacity under pressure, inherently possessed by types of absorbent resins.

An object of this invention, therefore, is to provide an absorbent resin and a novel method for the production thereof.

Another object of this invention is to provide an absorbent resin excelling in absorption properties and possessing a low residual monomer content and a method for stable and efficient production thereof.

Disclosure of Invention

These objects are accomplished by a method for the production of an absorbent resin (5), characterized by adding to 100 parts by weight of an absorbent resin powder (1) an aqueous liquid containing 7 to 100 parts by weight of water and a reducing substance (4) in the presence of 0.01 to 5 parts by weight of at least one additive selected from the group consisting of water-insoluble fine powders (2) and surfactants (3) {hereinafter referred to as "additive (A)"}.

These objects are also accomplished by an absorbent resin (5), obtained by adding to 100 parts by weight of an absorbent resin powder (1) an aqueous liquid containing 7 to 100 parts by weight of water and a reducing substance (4) in the presence of 0.01 to 5 parts by weight of at least one additive selected from the group consisting of water-insoluble fine powders (2) and surfactants (3) {hereinafter referred to as "additive (A)"}.

BEST MODE FOR CARRYING OUT THE INVENTION

The absorbent resin powder (1) to be used in the present invention is a substance which, in water, absorbs a large amount of water and swells with the absorbed water to form a hydrated gel (hydrogel). The absorbent resin powders which answer this description include hydrolyzed starch-acrylonitrile graft polymer, neutralized starch-acrylic acid graft polymer, saponified acrylic ester-vinyl acetate copolymers, hydrolyzed acrylonitrile copolymers or acrylamide copolymers, neutralized self-cross-linking polyacrylic acid, partially neutralized and cross-linked polyacrylic acid, and neutralized cross-linked isobutylene-maleic anhydride copolymer, for example. The absorbent resin powder (1) can be used either in a form having a uniform cross-linking density or in a form having the surface region and the vicinity thereof exclusively treated for cross-linking. Preferably, in the light of the various absorption properties of the finally produced resin, a cross-linked polymer of a water-soluble ethylenically unsaturated monomer having acrylic acid (acrylate) as a principal component thereof proves to be preferable and, from the standpoint of the extent of decrease of the residual monomer, a polymer having the surface region and the vicinity thereof treated with a cross-linking agent capable of reacting with the functional group possessed by the absorbent resin powder prior to the treatment proves to be most preferable. This polymer is produced simply by adding to the surface of the absorbent resin powder a cross-linking agent capable of reacting with the functional group possessed by the absorbent resin powder and heating the cross-linking agent as deposited on the surface thereby causing a reaction between the cross-linking agent and the surface of the absorbent resin powder.

The cross-linking agents which are usable herein when the absorbent resin powder to be used is of a type possessing a carboxyl group include polyhydric alcohol compounds such as pentaerythritol, trimethylol propane, ethylene glycol, diethylene glycol, propylene glycol, polyethylene glycol, glycerol, and polyvinyl alcohol, polyglycidyl ether compounds such as ethylene glycol diglycidyl ether, glycerol triglycidyl ether, polyethylene glycol diglycidyl ether, and propylene glycol diglycidyl ether, and salts of such polyvalent metals as zinc, calcium, magnesium, aluminum, and zirconium.

This invention does not discriminate the absorbent resin powder (1) on account of the kind of method employed for the production thereof. Various methods including an aqueous solution polymerization method and a reverse phase suspension polymerization method, for example, are available.

To be used advantageously in this invention, the absorbent resin powder (1) is preferable to have a water content of not more than 30% by weight, preferably not more than 15% by weight.

In the absorbent resin powder (1) (more often than not containing 100 to 3,000 ppm of a residual monomer) obtained as described above, this invention efficiently attains a conspicuous decrease in the residual monomer content by adding to and mixing with the absorbent resin powder (4) a reducing substance and an aqueous liquid containing a specific amount of water in the presence of (A) an additive. The amount of water in the aqueous liquid to be added in this case is in the range of 7 to 100 parts by weight, based on 100 parts by weight of (1) the absorbent resin powder. If the amount of water so added is less than 7 parts by weight, the ratio of decrease of the residual monomer is unduly low and the used reducing substance tends to persist in the produced resin and raise a problem of deficiency in safety. Conversely, if the amount of water exceeds 100 parts by weight, though the ratio of decrease of the residual monomer is large, the added water entails an economic disadvantage of necessitating an extra step of drying and possibly impairs the various absorption properties of the absorbent resin powder (1) such as absorption capacity under pressure and suction power. The amount of water to be added is preferable to be in the range of 7 to 50 parts by weight, preferably 7 to 30 parts by weight. Generally, this water is preferable to dissolve (4) the aforementioned reducing substance in the whole or part of the amount thereof. Optionally, part or the whole of the water may be added to (1) the absorbent resin powder in the form of steam or ice.

This invention, owing to the indispensable use of (2) the water-insoluble fine powder and/or (3) the surfactant during the course of the mixing mentioned above, attains a conspicuous decrease of the residual monomer in (1) the absorbent resin powder without impairing the absorption properties mentioned above.

The materials which are usable for (2) the water-insoluble fine powder include water-insoluble powdery inorganic substances such as silicon dioxide, titanium dioxide, aluminum oxide, magnesium oxide, zinc oxide, talc, calcium phosphate, barium phosphate, clay, diatomaceous earth, zeolite, bentonite, kaolin, hydrotalcite, and activated clay and water-insoluble powdery organic substances such as cellulose powder, pulp powder, ethyl cellulose, ethyl hydroxyethyl cellulose, cellulose acetate butyrate, modified starch, chitin, rayon, polyesters, polyethylene, polypropylene, polyvinyl chloride, polystyrene, nylon, polymethyl methacrylate, melamine resins, melamine, benzoguanamine resin, activated carbon, and tea leaves, for example. These materials can be used either singly or in the form of a combination of two or more members.

Optionally, (2) the water-insoluble fine powder may be used in the form of an emulsion in water or in a varying solvent.

The particle diameters of (2) the water-insoluble fine powder are required to be not more than 1,000 $\mu$m, preferably not more than 100 $\mu$m, more preferably not more than 50 $\mu$m, and most preferably no more than 10 $\mu$m.

In (2) the water-insoluble fine powders mentioned above, the water-insoluble powdery inorganic substances prove to be more preferable. In these powdery inorganic substances, silicon dioxide, titanium dioxide, aluminum oxide, zeolite, kaolin, and hydrotalcite prove to be particularly preferable. Inorganic powders such as sepiolite which possess a deodorizing ability can be used particularly advantageously in this invention. Further, in the water-insoluble powdery organic substances, pulp, cellulose powder, a methyl methacrylate polymer powder having particle diameters of not more than 5 $\mu$m, and activated carbon prove to be preferable. These powders are used advantageously in this invention in a form having part thereof treated for impartation of hydrophobicity.

As (3) the surfactants usable effectively herein, anionic surfactants, nonionic surfactants, cationic surfactants, amphoteric surfactants, and polymer surfactants may be cited. These surfactants can be used either singly or in the form of a combination of two or more members.

The anionic surfactants include higher alcohol sulfuric ester salts, alkyl naphthalene sulfonates, alkyl polyoxyethylene sulfates, and dialkyl sulfosuccinates, for example, the nonionic surfactants include sorbitan fatty acid esters, polyoxyethylene sorbitan fatty acid esters, (poly)glycerol fatty acid esters, polyoxyethylene alkyl ethers, polyoxyethylene alkyl phenol ethers, polyoxyethylene acyl esters, and sucrose fatty acid esters, for example, the cationic surfactants include alkyl quaternary ammonium salts and alkyl amine salts, for example, the amphoteric surfactants include alkyl betaines and lecithin, for example, and the polymer surfactants include polymers possessing an oleophilic carboxyl group and ethylene oxide-propylene oxide block polymer, for example.

In these surfactants (3), water-soluble and/or water-dispersible surfactants which avoid impairing the absorption properties of the final product and exhibit a highly satisfactory effect in decreasing the residual monomer prove to be particularly preferable. In the surfactants of this description, anionic surfactants or nonionic surfactants having an HLB of not less than 7, preferably an HLB of not less than 10 are usable particularly advantageously.

In the execution of this invention, the aforementioned water-insoluble fine powder (2) and the surfactant (3) may be used simultaneously. The total amount of these components to be used is generally in the range of 0.01 to 5 parts by weight based on 100 parts by weight of (1) the absorbent resin powder. If the total amount is less than 0.01 part by weight, there arises the possibility that the effect in decreasing the residual monomer will not be fully manifested and the various absorption properties of the absorbent resin powder (1) will be impaired. Conversely, if the total amount exceeds 5 parts by weight, the original properties of the absorbent resin powder (1) will be impaired by the amount of additive (A). The total amount of these components to be used is preferably in the range of 0.1 to 3 parts by weight.

The effect in decreasing the residual monomer content may be possibly enabled to manifest more conspicuously by allowing an organic solvent to be present in the aqueous liquid to be added. The organic solvents which are usable for this purpose include hydrophilic organic solvents such as methanol, ethanol, isopropanol, butanol, ethylene glycol monomethyl ether, ethylene glycol monoethyl ether, propylene glycol monomethyl ether, tetrahydrofuran, dimethyl formamide, dimethyl sulfoxide, acetone, and methylethyl ketone and hydrophobic organic solvents such as n-pentane, n-hexane, n-heptane, n-octane, cyclohexane, cyclooctane, methyl cyclohexane, decalin, benzene, ethyl benzene, toluene, and xylene, for example. The hydrophilic organic solvents are more preferable than the hydrophobic organic solvents.

Where a hydrophilic organic solvent is selected, there may be adopted a method of using the solvent as mixed in advance with water or an aqueous solution of the reducing substance (4). Where a hydrophobic organic solvent is selected, there may be adopted a method of suspending and emulsifying the water or the aqueous solution of the reducing substance in the hydrophobic organic solvent through the agency of the surfactant (3) and adding the resultant emulsion to the absorbent resin powder (1).

The amount of the organic solvent to be used generally is in the range of 0.01 to 50 parts by weight based on 100 parts by weight of the absorbent resin powder (1), though variable with the amount of the water to be used. Particularly where a hydrophilic organic solvent is used, the possibility arises that the ratio of decrease of the residual monomer will be unduly low if the organic solvent content in the aqueous liquid exceeds 20% by weight. If the amount is less than 0.01 part by weight, the effect of the use of an organic solvent is not manifested. If the amount exceeds 50 parts by weight, the final product proves to be uneconomical. Preferably, the amount is in the range of 0.01 to 8% by weight.

As the reducing substance (4) to be added to the residual monomer in the present invention, any of the known substances mentioned in JP-B-33-2,646(1958) and JP-A-56-103,207(1981) may be employed. The reducing substances (4) which are usable herein include sulfurous acid (sulfites), hydrogen sulfites, phosphorous acid (phosphites), hypophosphorous acid (hypophosphites), thiosulfuric acid (thiosulfates), ammonia, amines, and amino acids, for example.

Typical examples of the reducing substance (4) are sodium sulfite, potassium sulfite, calcium sulfite, ammonium sulfite, sulfurous acid, potassium hydrogen sulfite, sodium hydrogen sulfite, ammonium hydrogen sulfite, sodium thiosulfate, ammonium thiosulfate, potassium thiosulfate, magnesium thiosulfate, sodium hyposulfite, potassium hyposulfite, ammonium hyposulfite, sodium phosphite, potassium phosphite, ammonium phosphite, ammonia, ammonium chloride, methyl amine, ethyl amine, butyl amine, dimethyl amine. diethyl amine, cyclohexyl amine, monoethanol amine, diethanol amine, isopropanol amine, benzyl amine, morpholine, glycin, alanine, valine, leucine, serine, threonine, cysteine, cystine, thyrosine, aspartic acid, glutamic acid, lysine, and arginine. These reducing substances can be used either singly or in the form of a combination of two or more members, with due regard to the reactivity to be manifested.

Among other reducing substances mentioned above, sulfurous acid (sulfites), hydrogen sulfites, ammonia, and amino acids prove to be particularly desirable and sulfurous acid (sulfites) and hydrogen sulfites prove to the most desirable from the standpoint of the ratio of decrease of the residual monomer.

When the residual monomer content in the absorbent resin powder (1) is so large as to exceed 3,000 ppm, for example, the amount of the reducing substance (4) to be required generally increases. In this case, though the amount of the residual monomer is decreased, the reducing substance (4) persists in the resin, depending on the particular kind of reducing substance to be used, and the amount of the adduct suffered to persist in the resin increases. Thus, the unduly large residual monomer content possibly proves to be undesirable from the standpoint of safety of the resin.

In terms of the safety of the product, (1) the absorbent resin powder is preferable to have a residual monomer content in the range of 100 to 3,000 ppm, more ppm. The amount of the reducing substance (4) to be used is in the range of 0.001 to 1 part by weight, more preferably 0.005 to 0.1 part by weight, and most preferably 0.01 to 0.05 part by weight, based on 100 parts by weight of the absorbent resin powder (1).

If the amount of the reducing substance (4) exceeds 1 part by weight, there arises the possibility that the properties of the absorbent resin powder (1) will be impaired and the reducing substance (4) will persist in the resin. Conversely, if this amount is less than 0.001 part by weight, there ensues the possibility that the effect in decreasing the residual monomer will be inconspicuous.

As typical examples of the method of production for embodying the present invention, (A) a method which comprises preparatorily mixing the absorbent resin powder (1) with the water-insoluble fine powder (2) and/or the surfactant (3) and then uniformly mixing the resultant mixture with an aqueous solution of the reducing substance (4), (B) a method which comprises preparatorily mixing the absorbent resin powder (1) with the water-insoluble fine powder (2) and/or the surfactant (3) and then uniformly mixing the resultant mixture with the aqueous liquid obtained by preparing an aqueous solution of the reducing substance (4) and adding to the aqueous solution a hydrophilic organic solvent in an amount such as to avoid impairing the solubility of the reducing substance, (C) a method which comprises dissolving or dispersing the water-insoluble fine powder (2) and/or the surfactant (3) in an aqueous solution (or hydrophilic organic solvent containing aqueous solution) of the reducing substance (4) and then uniformly mixing the resultant solution or dispersion with the absorbent resin powder (1).

(D) a method which comprises preparing a hydrophobic organic solvent having the surfactant (3) dissolved or dispersed therein, dispersing in the solvent an aqueous solution (or a hydrophilic organic solvent-containing aqueous solution) of the reducing substance (4) thereby forming a emulsion or a suspension, and mixing the emulsion or suspension with the absorbent resin powder (1), when necessary, in the presence of the water-insoluble fine powder (2), and (E) a method which comprises preparatorily mixing the absorbent resin powder (1) with the water-insoluble fine powder (2) and/or the surfactant (3), then uniformly mixing the resultant mixture with (an aqueous solution of) the reducing substance (4), and further stirring the produced mixture and, at the same time, moistening the mixture with steam may be cited.

The device to be used for mixing varying components mentioned above may be selected from among conventional mixers and kneaders. The devices which are usable herein include cylindrical mixers, double-cone type mixers, fluidizing type mixers, V-shaped mixers, ribbon type mixers, screw type mixers, rotary disc type mixers, air current type mixers, twin arm type kneaders, internal mixers, maller type kneaders, roll mixers, and screw type extruders, for example. The mixer to be used is preferable to be provided with high-speed rotary paddles and endowed with a large mechanical mixing power for the purpose of further enhancing the effect in decreasing the residual monomer and acquiring high productivity. A method which comprises causing the absorbent resin powder (1) to flow down and spraying droplets of the aqueous liquid onto the falling resin powder thereby establishing parallel-flow contact of the two components without requiring any mechanical mixing power is also usable for embodying the present invention. In the absorbent resin which is obtained by mixing the relevant components as described above, the residual monomer may be possibly decreased efficiently by application of heat to the absorbent resin. Where the final product requires its water content to be adjusted, the adjustment is desired to be effected by heating. The device for this heating may be selected from among conventional driers and heating furnaces.

The devices which are usable include groove type agitation driers, rotary driers, disc driers, kneading driers, fluidized-bed driers, air-current driers, infrared driers, hot-air driers, and microwave driers, for example.

The heating temperature is in the range of 40° to 200° C., preferably 60° to 120° C., and more preferably 60° to 80° C. Depending on the kind of the reducing substance (4) to be used, the heat treatment described above may possibly prove to be effective in decreasing the residual amount of the substance. Where the residual amount of the reducing substance (4) is to be decreased further, an oxidizing substance may be added to the absorbent resin resulting from the heat treatment. In this case, since this addition of the oxidizing substance possibly results in an increase in the water-soluble component and a decrease in the absorption capacity, it must take place after the heat treatment. The oxidizing substances which are usable for this purpose include persulfates, hydrogen peroxide, hydroperoxides, oxygen, and air. Among the other oxidizing substances mentioned above, persulfates, oxygen, and air prove to be particularly preferable.

In the execution of this invention, a cross-linking agent possessing at least two functional groups capable of reacting with the functional group possessed by the absorbent resin (1) powder may be added to the reaction system during the mixture of the reducing substance (4) and subjected to the heat treatment. In this case, the absorbent resin powder (1) is preferable to possess a uniform cross-linking density. The cross-linking agents which are advantageously usable herein include the polyhydric alcohol compounds and polyglycidyl ether compounds mentioned above, for example. The amount of the cross-linking agent to be used is in the range of 0.01 to 10 parts by weight based on 100 parts by weight of the absorbent resin powder (1). The temperature of the heat treatment is in the range of 90° to 230° C. The absorbent resin may be endowed with a varying additional function by incorporating therein a pertinent additive selected from among deodorants, perfume, chemicals agents, plant growth auxiliaries, fungicides, dustproofing agents, foaming agents, pigments, dyes, hydrophilic short fibers, and fertilizers.

Now, the present invention will be described more specifically below with reference to working examples. It should be noted, however, that this invention is not limited to these examples. The term "parts" used in the following examples refers to "parts by weight" unless otherwise specified.

The residual monomer content was determined as follows.

In a beaker having an inner volume of 200 ml, 100 ml of deionized water was placed and 1.0 g of a sample absorbent resin was added thereto while in a stirred state until the deionized water was wholly gelled. One hour thereafter, the gel was shrunken by addition thereto of 5 ml of an aqueous phosphoric acid solution and stirred to form an absorbent resin dispersion. The dispersion was passed through a filter paper and the resultant filtrate was analyzed by high-performance liquid chromatography.

Separately, the residual monomer content in the absorbent resin was found by using as an external standard a calibration curve obtained by similarly analyzing a standard monomer solution of a known concentration and taking into consideration the ratio of dilution of the filtrate.

The ratio of decrease of the residual monomer was found by the following formula.

Ratio of decrease of residual monomer (%) ={1−(Residual monomer of absorbent resin after treatment of this invention)/(Residual monomer of absorbent resin before treatment of this invention)}×100

Referential Example

In 329 parts of deionized water, 141 parts of sodium acrylate, 36.1 parts of acrylic acid, and 0.093 part of N,N'-methylene bisacrylamide were dissolved. The resultant solution was purged of dissolved oxygen by blowing nitrogen gas into the solution. This aqueous monomer solution was kept at 30° C. Then, the solution and 0.3 part of sodium persulfate and 0.01 part of l-ascorbic acid added thereto were subjected to standing polymerization to form a hydrated gel polymer.

This polymer was dried with hot air at 150° C., pulverized with a hammer type pulverizer, and sieved with a 20-mesh metallic gauze to obtain a 20-mesh through absorbent resin powder (a). The residual monomer content of the absorbent resin powder (a) was found to be 343 ppm. The water content of this absorbent resin powder (a) was 4%. An absorbent resin powder (b) having the surface region and the vicinity thereof crosslinked was obtained by mixing 100 parts by weight of (a) the absorbent resin powder with an aqueous liquid comprising 1 part by weight of glycerol, 4 parts by weight of water, and 4 parts by weight of ethanol and heat-treating the resultant mixture at 180° C. for 30 minutes. The residual monomer content of (b) the absorbent resin powder was found to be 360 ppm. The water content of (b) the absorbent resin powder was 2%.

Example 1

One hundred (100) parts of (b) the absorbent resin powder obtained in Referential Example was mixed with 1.0 part of silicon dioxide (produced by Nippon Aerosil K.K. and marketed under trademark designation of "Aerosil 200") as (A) an additive. An aqueous liquid of a reducing substance was prepared by dissolving 0.05 part of sodium hydrogen sulfite as a reducing substance in 30 parts of water and 2 parts of isopropanol. By the use of a high-speed rotary paddle type mixer, the aqueous liquid was mixed with the aforementioned mixture of (b) the absorbent resin powder and silicon dioxide. Then, the resultant mixture was heated in a convection type hot-air drier at 70° C. for 2 hours, to obtain an absorbent resin (1) of this invention. The residual monomer content of the absorbent resin (1) was 52 ppm and the ratio of decrease of the residual monomer was 86%.

Example 2

One hundred (100) parts of (b) the absorbent resin powder obtained in Referential Example was mixed with 0.7 part of sodium dialkyl sulfosuccinate (produced by Kao Co., Ltd. and marketed under trademark designation of "Pellex OT-P"), a surfactant as (A) an additive. By the use of a high-speed rotary paddle type mixer, a solution of 0.05 part of sodium hydrogen sulfite as a reducing substance in 20 parts by water was mixed with the aforementioned mixture of the absorbent resin powder (b) and the surfactant. Then, the resultant mixture was heated with a fluidized-bed type drier at 90° C. for 2 hours, to obtain an absorbent resin (2) of this invention. The residual monomer content in the absorbent resin (2) was 85 ppm and the ratio of decrease of the residual monomer was 76%.

Examples 3 to 13

Absorbent resins (3) to (13) of this invention, were obtained by following the procedure of Example 1, except that the kind and amount of (A) additive, the kind and amount of the reducing substance, the amount of water added, the kind and amount of organic solvent, and the conditions of heating after mixture were varied as shown in Table 1. These absorbent resins were analyzed to determine the residual monomer contents and the ratios of decrease of residual monomer. The results are shown in Table 1.

TABLE 1

| Example | Absorbent resin | Additive(A) Kind | Additive(A) Amount (parts) | Reducing substance Kind | Reducing substance Amount (parts) | Water added (parts) | Organic solvent (parts) | Heating conditions | Residual monomer content (ppm) | Ratio of decrease (%) |
|---|---|---|---|---|---|---|---|---|---|---|
| 3 | (3) | hydrophobilized silicon dioxide [Nippon Aerosil K.K., Aerosil R 972] | 1.0 | sodium hydrogen sulfite | 0.1 | 40 | ethanol 2 | 100° C. 2 hrs | 43 | 88 |
| 4 | (4) | Aluminum oxide [DEGUSSA, aluminum oxide C] | 2.0 | sodium hydrogen sulfite | 0.1 | 50 | isopropanol 4 | 120° C. 3 hrs | 31 | 91 |
| 5 | (5) | Activated carbon | 2.0 | sodium hydrogen sulfite | 0.3 | 10 | isopropanol 2 | 80° C. 1 hrs | 165 | 54 |
| 6 | (6) | Polymethyl methacrylate fine powder / Sepiolite [hydrated magnesium containing clayish material] | 0.5 / 0.5 | sodium hydrogen sulfite | 0.3 | 15 | methanol 1 | 80° C. 1 hrs | 93 | 74 |
| 7 | (7) | Pulp powder [Sanyo Kokusaku Pulp K.K., Pulpfloc W-4] | 1.5 | sodium hydrogen sulfite | 0.3 | 20 | ethanol 2 | 80° C. 1 hrs | 78 | 78 |
| 8 | (8) | Sodium dodecyl benzene sulfonate [Kao Co., Ltd., Neopelex No. 25] | 0.8 | sodium hydrogen sulfite | 0.3 | 25 | not used | 80° C. 1 hrs | 62 | 83 |

TABLE 1-continued

| Example | Absorbent resin | Additive(A) Kind | Amount (parts) | Reducing substance Kind | Amount (parts) | Water added (parts) | Organic solvent (parts) | Heating conditions | Residual monomer content (ppm) | Ratio of decrease (%) |
|---|---|---|---|---|---|---|---|---|---|---|
| 9 | (9) | Polyoxyethylene sorbitan monolaurate [Kao Co., Ltd., Leodol TW-L 120] | 1.0 | sodium sulfite | 0.5 | 25 | isopropanol 1 | 80° C. 1 hrs | 58 | 84 |
| 10 | (10) | Silicon dioxide [Nippon Aerosil K.K., Aerosil 200] Sodium dialkyl sulfosuccinate [Kao Co., Ltd., Pelex OT-P] | 0.8<br><br>0.5 | sodium sulfite | 0.5 | 70 | isopropanol 7 | 120° C. 3 hrs | 7 | 98 |
| 11 | (11) | Silicon dioxide [Nippon Aerosil K.K., Aerosil 200] | 1.0 | monoethanol-amine | 0.5 | 30 | isopropanol 2 | 150° C. 2 hrs | 111 | 69 |
| 12 | (12) | Silicon dioxide [Nippon Aerosil K.K., Aerosil 200] | 1.0 | ammonia | 0.5 | 30 | isopropanol 2 | 150° C. 2 hrs | 104 | 71 |
| 13 | (13) | Silicon dioxide [Nippon Aerosil K.K., Aerosil 200] | 1.0 | lysin | 1.0 | 30 | isopropanol 2 | 150° C. 2 hrs | 94 | 74 |

Example 14

By the use of a high-speed rotary paddle type mixer, 100 parts of (b) the absorbent resin powder obtained in Referential Example was mixed with a dispersion prepared by adding 1.0 part of silicon dioxide (produced by Nippon Aerosil K.K. and marketed under trademark designation of "Aerosil 200") to an aqueous liquid comprising 30 parts of an aqueous solution of 0.33% of ammonium hydrogen sulfite as a reducing substance and 2 parts of isopropanol. Then, the resultant mixture was heated with a convection type hot-air drier at 70° C. for 2 hours, to obtain an absorbent resin (14) of the present invention. The residual monomer content in the absorbent resin (14) was 58 ppm and the ratio of decrease of the residual monomer was 84%.

Example 15

By the use of a high-speed rotary paddle type mixer, 100 parts of the absorbent resin powder (b) obtained in Referential Example was mixed with a dispersion prepared by adding 1.0 part of sodium dialkyl sulfosuccinate (produced by Kao Co., Ltd. and marketed under trademark designation of "Pellex OT-P") to an aqueous liquid comprising 2 parts of isopropanol and 30 parts of water having dissolved therein 0.04 part of sodium sulfite as a reducing substance. Then, the resultant mixture was heated in a fluidized-bed type drier at 90° C. for 2 hours, to obtain (15) an absorbent resin absorbent resin was 83 ppm and the ratio of decrease of the residual monomer was 77%.

Example 16

An emulsified suspension in cyclohexane of an aqueous potassium hydrogen sulfite solution was obtained by dissolving 0.5 part of polyoxyethylene sorbitan monostearate (produced by Kao Co., Ltd. and marketed under trademark designation of "Leodol TW-S120") in 20 parts of cyclohexane and vigorously stirring the resultant solution with 20 parts of water having dissolved therein 0.2 part of potassium hydrogen sulfite as a reducing substance. The emulsified suspension was mixed with 100 parts of the absorbent resin powder (b) obtained in Referential Example. Then, the produced mixture was dried under a vacuum at 80° C. for 3 hours, to obtain an absorbent resin (16) of this invention. The residual monomer content in the absorbent resin (16) was 108 ppm and the ratio of decrease of the residual monomer was 70%.

Example 17

One hundred (100) parts of the absorbent resin (b) powder obtained in Referential Example was mixed with 0.5 part of silicon dioxide (produced by Nippon Aerosil K.K. and marketed under trademark designation of "Aerosil 380"). By the use of a high-speed rotary paddle type mixer, an aqueous solution of 0.2 part of sodium hydrogen sulfite as a reducing substance in 5 parts of water was mixed with the aforementioned mixture of the absorbent resin and silicon dioxide. Then, the produced mixture was moistened by being stirred and, at the same time, exposed to steam. A sample of the moistened mixture was found by analysis to have a water content of 34 parts.

The mixture was heated in a convection type hot-air type drier at 100° C. for 2 hours, to obtain an absorbent resin (17) of the present invention. The residual monomer content in the absorbent resin (17) was 105 ppm and the ratio of decrease of the residual monomer was 71%.

Examples 18 to 24

In Examples 18 to 24, absorbent resins (18) to (24), were obtained by respectively repeating the procedures of Examples 1 to 7, except that the absorbent resin powder (a) obtained in Referential Example was used in the place of the absorbent resin powder (b) used in Example 1. The results are shown in Table 2.

TABLE 2

| Example | Absorbent resin | Additive(A) Kind | Additive(A) Amount (parts) | Reducing substance Kind | Reducing substance Amount (parts) | Water added (parts) | Organic solvent (parts) | Heating conditions | Residual monomer content (ppm) | Ratio of decrease (%) |
|---|---|---|---|---|---|---|---|---|---|---|
| 18 | (18) | Silicon dioxide [Nippon Aerosil K.K., Aerosil 200] | 1.0 | sodium hydrogen sulfite | 0.05 | 30 | isopropanol 2 | 70° C. 2 hrs | 68 | 80 |
| 19 | (19) | Sodium dialkyl sulfosuccinate [Kao Co., Ltd., Pelex OT-P] | 0.7 | sodium hydrogen sulfite | 0.05 | 20 | not used | 90° C. 2 hrs | 99 | 71 |
| 20 | (20) | hydrophobilized silicon dioxide [Nippon Aerosil K.K., Aerosil R 972] | 1.0 | sodium hydrogen sulfite | 0.1 | 40 | ethanol 2 | 100° C. 2 hrs | 51 | 85 |
| 21 | (21) | Aluminum oxide [DEGUSSA, aluminum oxide C] | 2.0 | sodium hydrogen sulfite | 0.1 | 50 | isopropanol 4 | 120° C. 3 hrs | 48 | 86 |
| 22 | (22) | Activated carbon | 2.0 | sodium hydrogen sulfite | 0.3 | 10 | isopropanol 2 | 80° C. 1 hrs | 167 | 51 |
| 23 | (23) | Polymethyl methacrylate fine powder / Sepiolite [hydrated magnesium containing clayish material] | 0.5 / 0.5 | sodium hydrogen sulfite | 0.3 | 15 | methanol 1 | 80° C. 1 hrs | 109 | 68 |
| 24 | (24) | Pulp powder [Sanyo Kokusaku Pulp K.K., Pulpfloc W-4] | 1.5 | sodium hydrogen sulfite | 0.3 | 20 | ethanol 2 | 80° C. 1 hrs | 88 | 74 |

Examples 25 to 28

In Example 25, an experiment was performed by following the procedure of Example 15, except that the absorbent resin powder (a) was used in the place of the absorbent resin powder (b). Thus, absorbent resin (25) was obtained. In Examples 26 to 28, absorbent resins (26) to (28), were obtained by following the procedure of Example 25, except that the kind of additive (A) and the amount of water added etc were varied as shown in Table 3. The results of Examples 25 to 28 are shown in Table 3.

TABLE 3

| Example | Absorbent resin | Additive(A) Kind | Additive(A) Amount (parts) | Reducing substance Kind | Reducing substance Amount (parts) | Water added (parts) | Organic solvent (parts) | Heating conditions | monomer content (ppm) | Ratio of decrease (%) |
|---|---|---|---|---|---|---|---|---|---|---|
| 25 | (25) | Sodium dialkyl sulfosuccinate [Kao Co., Ltd., Pelex OT-P] | 1.0 | sodium sulfite | 0.04 | 30 | isopropanol 2 | 90° C. 2 hrs | 88 | 74 |
| 26 | (26) | Sodium dodecyl benzene sulfonate [Kao Co., Ltd., Neopelex No. 25] | 0.8 | sodium sulfite | 0.04 | 25 | isopropanol 2 | 90° C. 2 hrs | 75 | 78 |
| 27 | (27) | Polyoxyethylene sorbitan monolaurate [Kao Co., Ltd., Leodol TW-L 120] | 1.0 | sodium sulfite | 0.04 | 25 | isopropanol 1 | 90° C. 2 hrs | 68 | 80 |
| 28 | (28) | Lauryl trimethyl ammonium chloride [Kao C., Ltd., Kotamine 24P] | 2.0 | sodium sulfite | 0.04 | 20 | not used | 90° C. 2 hrs | 102 | 70 |

Control 1

An absorbent resin for comparison (1) was prepared by following the procedure of Example 1, except that the addition of silicon dioxide was omitted. The residual monomer content of the absorbent resin for comparison (1) was 152 ppm and the ratio of decrease of the residual monomer was 58%.

Control 2

An absorbent resin for comparison (2) was prepared by following the procedure of Example 2, except that the use of sodium dialkyl sulfosuccinate was omitted. The residual monomer content of the absorbent resin (2) was 192 ppm and the ratio of decrease of the residual monomer was 47%.

Control 3

An absorbent resin for comparison (3) was obtained by following the procedure of Example 2, except that 0.05 part of sodium hydrogen sulfite was dry blended with the absorbent resin powder (b) in the presence of sodium dialkyl sulfosuccinate without using 20 parts of water. The residual monomer content of the absorbent resin for comparison (3) was 335 ppm and the ratio of decrease of the residual monomer was as low as 7.0%.

Control 4

An absorbent resin for comparison (4) was obtained by following the procedure of Example 2, except that 0.05 part of sodium hydrogen sulfite was dry blended with the absorbent resin powder (b) without using sodium dialkyl sulfosuccinate and 20 parts of water. The residual monomer content of the absorbent resin for comparison (4) was 331 ppm and the ratio of decrease of the residual monomer was as low as 8.0%.

Controls 5 to 8

In Controls 5 to 8, varying reducing substances and water shown in Table 4 were severally mixed with 100 parts of a commercially available absorbent resin powder (c) containing 1,080 ppm of residual monomer. The residual monomer contents in the absorbent resins (5) to (8) and the ratios of decrease of the residual monomer are shown in Table 4.

TABLE 4

| Controls | Absorbent resin for comparison | Reducing substance Kind, Amount (part) | | Water added (parts) | Residual monomer (ppm) | Ratio of decrease (%) |
|---|---|---|---|---|---|---|
| 5 | (5) | Sodium hydrogen sulfite | 0.3 | 5 | 810 | 25 |
| 6 | (6) | Ammonia | 0.5 | 4 | 920 | 15 |
| 7 | (7) | Monoethanol amine | 0.3 | 4 | 885 | 18 |
| 8 | (8) | Sodium hydrogen sulfite | 0.2 | 3 | 895 | 17 |

Example 29

One hundred (100) parts of the absorbent resin powder (b) obtained in Referential Example was mixed with 1.0 part of silicon dioxide (produced by Nippon Aerosil K.K. and marketed under trademark designation of "Aerosil 200"). An aqueous liquid of a reducing substance was prepared by dissolving 0.05 part of sodium hydrogen sulfite as a reducing substance in 80 parts of water and 5 parts of isopropanol. By the use of a high-speed rotary paddle type mixer, the aqueous liquid was mixed with the aforementioned mixture of the absorbent resin powder (b) and silicon dioxide. Then, the produced mixture was heated with a convection type hot-air drier at 80° C. for 2 hours, to obtain an absorbent resin (29) of this invention. The absorbent resin (29) was tested for residual monomer content, ratio of decrease of the residual monomer, absorption capacity, suction power, absorption capacity under pressure, and water-soluble content. The results are shown in Table 5.

The absorption capacity, absorption capacity under pressure, suction power, and water-soluble content mentioned above were determined by the following procedures.

(a) Absorption capacity

This property was determined by uniformly placing 0.2 g of a sample absorbent resin in a tea bag type pouch (40 mm×150 mm) made of non-woven fabric, keeping the filled pouch immersed in an aqueous 0.9 wt % sodium chloride solution for 30 minutes, removing the pouch from the aqueous solution, allowing the wet pouch to drain for a prescribed time, weighing the pouch, and calculating the following formula using the found weight.

Absorption capacity (g/g)={Weight of wet pouch (g)−Blank (g)}/{Weight of absorbent resin (g)}

(b) Absorption capacity under pressure

Figure 1:
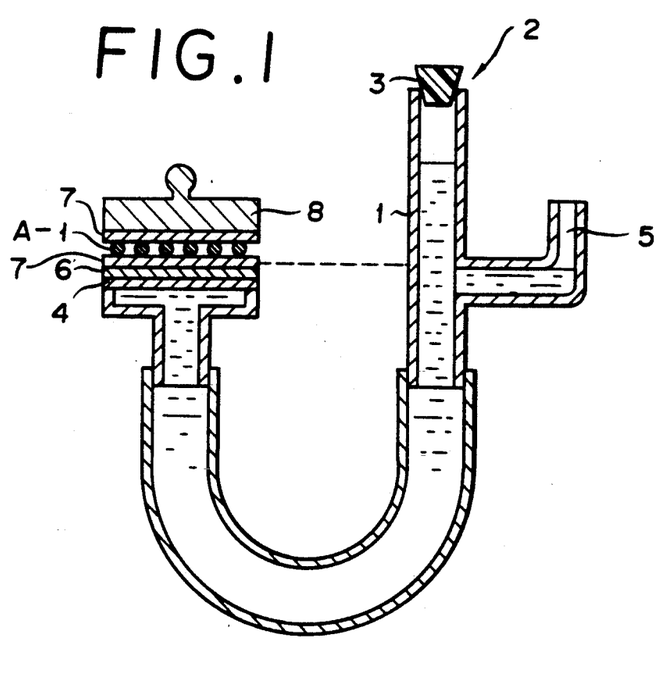
FIG. 1 is a schematic cross section of a device for the determination of absorption capacity under pressure to be used in the present invention.

The absorption capacity under pressure was determined by the use of a device illustrated in FIG. 1. This determination was carried out by fitting a stopper 3 in an opening 2 of a buret 1, setting a measuring base 4 and an air inlet 5 on the same level, placing a filter paper, 0.2 g of a sample absorbent resin (A-1), and a filter paper 7 on a glass filter (No. 1) 70 mm in diameter placed in the measuring base 4, further placing a weight of 20 g/cm2 on top of the filter paper 7, and allowing the absorbent resin to absorb synthetic urine for 30 minutes. The volume (A ml) of the synthetic urine consequently absorbed by the absorbent resin was measured. The absorption capacity under pressure (ml/g) was represented by following formula.

Absorption capacity under pressure (ml/g) =A(ml)/0.20(g)

(c) Suction power

This property was determined by adding 20 ml of synthetic urine (containing 1.9% of urea, 0.8% of NaCl, 0.1% of CaCl$_2$, and 0.1% of MgSO$_4$) onto a tissue paper (55 mm×75 mm) thereby preparing a substrate containing the synthetic urine, allowing 1.0 g of a sample absorbent resin to stand on the substrate for 10 minutes, then collecting a swollen gel, and weighing the swollen gel. The weight was reported as the power of the absorbent resin to aspirate the liquid from the wet tissue paper. At the same time, the swollen gel was visually examined to decide between presence and absence of fish eyes.

(d) Water-soluble content

This property was determined by allowing 0.5 g of a sample absorbent resin to stand at 37° C. for 12 hours in a tightly closed vessel containing 50 ml of deionized water thereby obtaining a swelled gel, stirring the swelled gel and 950 ml of deionized water added thereto for 30 minutes, passing the resultant mixture through a filter paper, and subjecting the filtrate to colloid titration thereby finding the water-soluble content (%).

Example 30

An absorbent resin (30) was obtained by following the procedure of Example 29, except that 20 parts of water and 2 parts of isopropanol were used in the place of 80 parts of water and 5 parts of isopropanol. The absorbent resin (30) was tested for residual monomer content, ratio of decrease of the residual monomer, absorption capacity, suction power, absorption capacity under pressure, and water-soluble content. The results are shown in Table 5.

Example 31

One hundred (100) parts of the absorbent resin powder (a) obtained in Referential Example was mixed with 1.0 part of silicon dioxide (produced by Nippon Aerosil K.K. and marketed under trademark designation of "Aerosil 200"). An aqueous liquid was prepared by dissolving 0.05 part of sodium hydrogen sulfite as a reducing substance and 0.05 part of ethylene glycol diglycidyl ether as a cross-linking agent in 25 parts of water and 2 parts of isopropanol. This aqueous liquid and the aforementioned mixture of the absorbent resin powder (a) and silicon dioxide added thereto were mixed by the use of a high-speed rotary paddle type mixer. The produced mixture was further stirred and heated at 120° C. for 40 minutes, to obtain an absorbent resin (31) of this invention. The absorbent resin (31) was tested for residual monomer content, ratio of decrease of the residual monomer, absorption capacity, suction power, absorption capacity under pressure, and water-soluble content. The results are shown in Table 5.

Control 9

An absorbent resin for comparison (9) was obtained by following the procedure of Example 29, except that the use of silicon dioxide (produced by Nippon Aerosil K.K. and marketed under trademark designation of "Aerosil 200") was omitted. The absorbent resin for comparison (9) was tested for residual monomer content, ratio of decrease of the residual monomer, absorption capacity, suction power, absorption capacity under pressure, and water-soluble content. The results are shown in Table 5.

Control 10

An absorbent resin for comparison (10) was obtained by mixing 100 parts of the absorbent resin powder (b) with 1 part of silicon dioxide (produced by Nippon Aerosil K.K. and marketed under trademark designation of "Aerosil 200"). The absorbent resin for comparison (10) was tested for residual monomer content, ratio of decrease of the residual monomer, absorption capacity, suction power, absorption capacity under pressure, and water-soluble content. The results are shown in Table 5.

Control 11

One hundred (100) parts of the absorbent resin powder (b) was mixed with 2 parts of silicon dioxide (produced by Nippon Aerosil K.K. and marketed under trademark designation of "Aerosil 200"). By the use of a high-speed paddle type mixer, an aqueous liquid having 0.5 part of ammonium persulfate as a radical polymerization initiator dissolved in 20 parts of water was mixed with the aforementioned mixture of the absorbent resin powder (b) and silicon dioxide. The produced mixture was left standing at 80° C. for 30 minutes, to obtain an absorbent resin for comparison (11). The absorbent resin for comparison (11) was tested for residual monomer content, ratio of decrease of the residual monomer, absorption capacity, suction power, absorption capacity under pressure, and water-soluble content. The results are shown in Table 5.

TABLE 5

| | | Residual monomer (ppm) | Ratio of decrease (%) | Absorption capacity (g/g) | Absorption capacity under pressure (ml/g) | Aspiration force (g) | Existance of fish eyes | Water soluble content (%) |
|---|---|---|---|---|---|---|---|---|
| Referenctial Example | Absorbent resin (b) | 360 | — | 42 | 27 | 16.1 | ◯ | 12 |
| Example 29 | Absorbent resin (29) | 31 | 91 | 44 | 27 | 16.2 | ◯ | 13 |
| Example 30 | Absorbent resin (30) | 76 | 79 | 43 | 27 | 16.0 | ◯ | 12 |
| Example 31 | Absorbent resin (31) | 40 | 88 | 41 | 27 | 16.8 | ◯ | 12 |
| Control 9 | Absorbent resin for comparison (9) | 97 | 73 | 42 | 22 | 14.1 | X | 13 |
| Control 10 | Absorbent resin for comparison (10) | 355 | 1 | 44 | 27 | 15.4 | ◯ | 12 |
| Control 11 | Absorbent resin for comparison (11) | 130 | 64 | 39 | 23 | 15.1 | ◯ | 18 |

◯ None
X Exist

It is clearly noted from Tables 4 and 5 that for the purpose of decreasing the residual monomer content in the absorbent resin by the addition reaction of a reducing substance, the amount of water to be added to the absorbent resin forms a very important factor and that the decrease of the residual monomer content is not efficiently attained when the amount of water added is insufficient. When (A) the additive which is an indispensable component for this invention is not used but a large amount of water is added instead, the ratio of decrease of the residual monomer content is low as compared with what is attained when (A) the additive is used and the absorption properties inherent in the absorbent resin may be possibly impaired conspicuously.

It has been demonstrated that the residual monomer content can be decreased very efficiently without a sacrifice of the absorption properties inherent in the absorbent resin by using the additive (A) of this invention at the time of addition of a reducing substance and a specific amount of water. Thus, the present invention allows stable and efficient production of an absorbent resin exhibiting high safety and excelling in absorption properties.

Industrial Applicability

In accordance with the present invention, the residual monomer content in the absorbent resin powder (1) can be decreased very efficiently and the absorbent resin (5) having a very low residual monomer content can be produced easily and efficiently. Moreover, the method of this invention is incapable of impairing in any way the absorption properties inherent in the absorbent resin powder (1).

The absorbent resin (5) obtained by the present invention, therefore, is enabled by the characteristic properties thereof to find favorable utility in absorbents for such sanitary materials as disposable diapers and sanitary napkins, as a water-retaining agent for agriculture and horticulture, and as a dehydrating agent for various industries, i.e. the applications demanding the ability to absorb and retain water.

We claim:

1. A method for the production of an absorbent resin (5) which comprises adding to 100 parts be weight of an absorbent resin powder (1)
   (a) 0.01 to 5 parts by weight of at least one additive selected from the group consisting of water-insoluble fine powders (2) and surfactants (3),
   (b) an aqueous liquid containing 7 to 100 parts by weight of water and
   (c) a reducing substance (4), 2. A method according to claim 1, wherein said absorbent resin powder (1) has a uniform cross-linking density.

3. A method according to claim 1, wherein said absorbent resin powder (1) has the surface region and the vicinity thereof treated with a cross-linking agent capable of reacting with the functional group possessed by said absorbent resin powder in the untreated form.

4. A method according to claim 1, wherein said aqueous liquid contains 0.01 to 8 parts by weight of a hydrophilic organic solvent, based on 100 parts by weight of said absorbent resin powder (1).

5. A method according to claim 1, wherein the amount of water is in the range of 7 to 30 parts by weight, based on 100 parts by weight of said absorbent resin powder (1).

6. A method according to claim 4, wherein the proportion of said hydrophilic organic solvent to said aqueous liquid is not more than 20% by weight.

7. A method according to claim 1, wherein the addition of said aqueous liquid to said absorbent resin powder (1) is carried out with a high-speed rotary paddle type mixer.

8. A method according to claim 1, wherein said reducing substance (4) is at least one member selected from the group consisting of sulfurous acid (sulfites), hydrogen sulfites, ammonia, amines, and amino acids.

9. A method according to claim 1, wherein said reducing substance (4) is at least one member selected from the group consisting of sulfurous acid (sulfites) and hydrogen sulfites.

10. A method according to claim 8, wherein the amount of said reducing substance (4) is in the range of 0.001 to 1 part by weight based on 100 parts by weight of said absorbent resin powder (1).

11. A method according to claim 10, wherein the amount of said reducing substance (4) is in the range of 0.005 to 0.1 part by weight based on 100 parts by weight of said absorbent resin powder (1).

12. A method according to claim 1 wherein said absorbent resin powder (1) contains 100 to 3,000 ppm of residual monomer.

13. A method according to claim 12, wherein said absorbent resin powder (1) contains 100 to 500 ppm of residual monomer.

14. A method according to claim 1, wherein said additive is a water-insoluble fine powder (2).

15. A method according to claim 14, wherein said water-insoluble fine powder (2) has particle diameters of not more than 1,000 μm.

16. A method according to claim 15, wherein said water-insoluble fine powder (2) is a water-insoluble powdery inorganic substance.

17. A method according to claim 16, wherein said water-insoluble powdery inorganic substance is at least one member selected from the group consisting of silicon dioxide, titanium dioxide, aluminum oxide, zeolite, kaolin, hydrotalcite, and sepiolite.

18. A method according to claim 15, wherein said water-insoluble fine powder (2) is a water-insoluble powdery organic substance.

19. A method according to claim 18, wherein said water-insoluble fine powder (2) is a methyl methacrylate polymer having particle diameters of not more than 5 μm.

20. A method according to claim 1, wherein said additive is a surfactant (3).

21. A method according to claim 20, wherein said surfactant (3) is an anionic surfactant or a nonionic surfactant having an HLB of not less than 7.

22. A method according to claim 1, wherein a heat treatment is carried out at a temperature in the range of 40° to 200° C. after the addition of said aqueous liquid and said reducing substance (4).

23. A method according to claim 22, wherein said heat treatment is carried out at a temperature in the range of 60° to 80° C. after the addition of said aqueous liquid and said reducing substance (4).

24. A method according to claim 1, wherein said absorbent resin powder (1) is a cross-linked polymer of a water-soluble ethylenically unsaturated monomer having acrylic acid (or an acrylate) as a main component thereof.

25. A method according to claim 1, wherein said aqueous liquid contains a cross-linking agent possessing at least two functional groups capable of reacting with the functional group possessed by said absorbent resin powder (1).

26. A method according to claim 25, wherein the amount of said cross-linking agent is in the range of 0.01 to 10 parts by weight based on 100 parts by weight of said absorbent resin powder (1).

27. A method according to claim 25, wherein a heat treatment is carried out at a temperature in the range of 90° to 230° C. after the addition of said aqueous liquid and said reducing substance (4).

28. A method according to claim 1, wherein said powder (1) and said additive are mixed to form a first mixture, and said aqueous liquid and said reducing substance (4) are added to said first mixture.

29. A method according to claim 28, wherein said aqueous liquid and said reducing substance (4) are mixed to form a second mixture and then the second mixture is added to said first mixture.

30. A method according to claim 29, wherein said second mixture is added while said first mixture is being mixed.

31. A method according to claim 29, wherein said second mixture is added after the mixing of said first mixture.

32. A method according to claim 28, wherein said aqueous liquid and said reducing substance (4) are separately added to said first mixture.

33. A method according to claim 32, wherein said aqueous liquid and said reducing substance (4) are separately added after the mixing of said first mixture.

34. A method according to claim 32, wherein said aqueous liquid and said reducing substance (4) are separately added while said powder (1) and said additive are being mixed.

35. A method according to claim 1, wherein said additive, said aqueous liquid and said reducing substance (4) are added to said powder (1) simultaneously.

36. A method according to claim 1, wherein said aqueous liquid comprises water.

* * * * *